US012794388B2

(12) United States Patent
Vogt et al.

(10) Patent No.: US 12,794,388 B2
(45) Date of Patent: Nov. 10, 2026

(54) METHOD FOR OPERATING A DRIVE TRAIN HAVING AN ELECTROMOTIVE DRIVE

(71) Applicant: Robert Bosch GmbH, Stuttgart (DE)

(72) Inventors: Andreas Vogt, Renningen (DE); Peter Ropertz, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 18/713,232

(22) PCT Filed: Nov. 7, 2022

(86) PCT No.: PCT/EP2022/080928
§ 371 (c)(1),
(2) Date: May 24, 2024

(87) PCT Pub. No.: WO2023/094136
PCT Pub. Date: Jun. 1, 2023

(65) Prior Publication Data

US 2025/0038686 A1 Jan. 30, 2025

(30) Foreign Application Priority Data

Nov. 25, 2021 (DE) ..................... 10 2021 213 252.9

(51) Int. Cl.
*G05B 5/00* (2006.01)
*H02P 21/05* (2006.01)
*B60L 15/20* (2006.01)

(52) U.S. Cl.
CPC ............... *H02P 21/05* (2013.01); *B60L 15/20* (2013.01)

(58) Field of Classification Search
CPC .......... H02P 21/05; H02P 6/10; H02P 25/098; H02P 29/032; H02P 29/50
See application file for complete search history.

(56) References Cited

FOREIGN PATENT DOCUMENTS

DE 102014208384 A1 * 11/2014 .......... B60L 15/2054
DE 102015201313 A1 7/2016
(Continued)

OTHER PUBLICATIONS

Translation of International Search Report for Application No. PCT/EP2022/080928 dated Feb. 9, 2023 (2 pages).

*Primary Examiner* — Karen Masih
(74) *Attorney, Agent, or Firm* — Michael Best & Friedrich LLP

(57) ABSTRACT

The invention relates to a method for operating a drive train (2) having an electromotive drive (4), wherein a speed and a drive torque of the electromotive drive (4) can be converted via a toothed transmission stage (12) for an output (19), and the electromotive drive (4) is controlled with a control signal (40), wherein a periodic torque change signal (5) which alternately reduces and amplifies the drive torque is superimposed on the control signal (40) in order to damp transmission noises, wherein the periodic torque change signal (5) is in phase with a periodic change in the tooth stiffness of the toothed transmission stage (12). The method according to the invention proposes, on the basis of a software architecture extended by machine-learning knowledge, detecting a change in state of the drive train over the service life that can be attributed to a long-term change in the tooth stiffness of the transmission stage, and based on these changes, to adjust a torque control in such a way that progressive noise effects caused by ageing or wear can be better damped.

11 Claims, 4 Drawing Sheets

(56) References Cited

FOREIGN PATENT DOCUMENTS

| | | | |
|---|---|---|---|
| DE | 102015207632 | A1 | 10/2016 |
| DE | 102017218636 | A1 | 4/2019 |
| DE | 102020206669 | A1 | 12/2021 |

* cited by examiner

METHOD FOR OPERATING A DRIVE TRAIN HAVING AN ELECTROMOTIVE DRIVE

BACKGROUND

Electrically powered vehicle drive trains have a significantly quieter electromotive drive, or electric motor, compared to vehicles with an internal combustion engine. This makes noises noticeable that were not perceived in the combustion engine drive train. This applies in particular at low vehicle speeds, as the tire rolling noise and wind noise dominate at high speeds and mask any additional noise.

DE 10 2015 207 632 A1 relates to a device for reducing gearwheel noise of a drive gearwheel meshing with an output gearwheel, wherein forces can be introduced from the gearwheels into a housing via a support, wherein the device has a sensor device, a control device and an actuator and wherein a dynamic vibration signal can be detected by means of the sensor device and the vibration signal can be fed to the control device, wherein a vibration reduction signal can be generated by means of the control device, which signal can be fed to the actuator, wherein the actuator is arranged on or in the support in such a way that forces can be transmitted from the gearwheels via the actuator into the housing, wherein a relative displacement and/or a force application to a component carried by the support can be actively effected by means of the actuator. The device is also set up to use the actuator as a sensor device.

Furthermore, in the German patent application DE 10 2020 206 669.8, a method for operating a drive train with an electromotive drive has been applied for a patent, wherein a speed and a drive torque of the drive can be converted via a toothed transmission stage for an output, and the drive is controlled with a control signal.

DE 10 2020 206 669.8 recommends superimposing a periodic torque change signal on the control signal, which alternately reduces and increases the drive torque and is in phase with a change in tooth stiffness of the toothed transmission stage, wherein a signal strength of the torque change signal is lower with decreasing tooth stiffness than with increasing tooth stiffness.

In the method described in DE 10 2020 206 669.8, the vibrations of the transmission stage are actively damped with the meshing frequencies. The amplitude of the additionally applied periodic torque depends on the absolute values of the stiffness of the teeth involved in the toothed transmission stage. The additional torque course required for successful noise damping can, for example, be determined during the development phase and stored in the control of the electromotive drive. One advantage of this method is that there is little or no disturbing noise due to the variable tooth stiffness when two transmission gearwheels roll. Such a noise would be tonal and would increase with increasing torque transmitted via the transmission stage, as the tooth stiffness changes periodically over each individual pair of teeth currently in mesh. For simple spur gear stages, the frequency of this change is therefore the speed of the gearwheel multiplied by its number of teeth. The method described can be implemented as a software solution, wherein the software can also be implemented very late in the development process or even retrospectively, e.g. as a software update for vehicles in the field. The rotor position and the position of the gearwheels and an estimated value of the torque can be used as signals. The torque of the electric machine can be estimated by the field-oriented control and the rotor position is also measured or estimated for this. In principle, therefore, no additional sensors are required.

However, tribologically stressed machine elements, such as meshing gearwheels with their teeth, change over the service life caused by wear and ageing or fatigue. The material removal on the flanks of the gearwheels changes the tooth width over the service life and therefore also the stiffness of the teeth. This change in stiffness over a long period of time is progressive and can be linear, progressive or degressive, depending on the stress variables. The change in the tooth stiffness of a transmission stage over time caused by wear and ageing is not known at the time the transmission is designed and therefore cannot be mapped initially in the torque control.

SUMMARY

The aim of the present invention is to detect a change in the state of the drive train, which is attributable to a long-term extended change in the tooth stiffness of the transmission stage over the service life, and to adjust a torque control based on these changes so that noise developments caused by ageing or wear can be better damped.

For this purpose, a method for operating a drive train with an electromotive drive is proposed, in which a speed and a drive torque of the electromotive drive can be converted via a toothed transmission stage for an output. The electromotive drive is controlled with a control signal, wherein a periodic torque change signal is superimposed on the control signal for damping transmission noise, which alternately reduces and increases the drive torque, wherein the periodic torque change signal is in phase with a periodic tooth stiffness change of the toothed transmission stage. The method according to the invention comprises at least the following steps:

a) determining a current state variable of the drive train dependent on the tooth stiffness of the toothed transmission stage from at least one operating state signal of the drive train,
b) assigning the current state variable to a classification space of state variables, wherein state classes are assigned to all state variables of the classification space,
c) determination of a current state class assigned to the current state variable in the classification space,
d) checking whether the current state class determined in step c) of the determination is a specified target state class,
   wherein, if the current state class is not the target state class, the method further performs the following steps:
e) generating the periodic torque change signal as a function of a difference between the current state variable (Z') determined in step a) of the determination and the predetermined target state class,
f) superimposing the control signal with a periodic torque change signal generated as a function of the difference and
g) repeating steps a) through f) at least until it is established in step d) of testing that a current state variable assigned to the target state class was determined in the previous step a) of determining.

The method according to the invention can be used in purely electrically powered drive trains of vehicles, but also in other drive trains with electric machines that have a transmission but no combustion engine. Such a drive train can be a drive train from industrial technology or white goods, for example. White goods include refrigerators, freezers, etc. whose refrigerant compressor is driven by an electromotive drive. However, the white goods also include washing machines and dishwashers whose pump or drum is driven by an electromotive drive. In addition, the drive train according to the invention can also be used for power tools with a transmission. Such power tools with transmission include drills in particular. However, electric saws and grinders, for example, can also have such drive trains, each with a transmission.

By means of the present invention, operating state signals of the drive train, such as a rotor position signal of the electromotive drive, a torque or motor current signal of the electromotive drive and/or a structure-borne sound sensor signal, which detects the structure-borne sound of at least one component of the drive train, can be used to detect a temporal change in the tooth stiffness of a transmission stage resulting from ageing or wear, and measures can be initiated which counteract the noise development caused by this. Since the control signal is superimposed with a periodic torque change signal in the method, which is generated as a function of a difference between a state variable derived from at least one operating state signal and a target state class, the state variable dependent on the operating state signal changes as a result. This makes a control process possible.

Advantageous embodiments and further embodiments of the invention are made possible by the features indicated in the dependent claims.

It is particularly advantageous that, if it is established in step d) of testing that a current state variable assigned to the target state class was determined in the preceding step a) of determining, the method does not perform steps e) of generating and f) of superimposing and instead forms the periodic torque change signal in one step independently of the current state variable and superimposes it on the control variable, and repeats steps a) through d) until it is established in step d) of testing that the determined current state class is not the specified target state class. When the target state class is reached, the torque control is in the desired target state; a further change in the state variable could therefore, in an unfavorable case, cause the control algorithm to run out of the target corridor. Therefore, when the target state class is reached, it is advantageous to suspend the step of generating the periodic torque change signal as a function of a difference between the current state variable determined in step a) and the specified target state class and the subsequent superimposing the control signal with a periodic torque change signal generated as a function of the difference. Instead, the periodic torque change signal, which can be generated analogously to the representation in DE 10 2020 206 669.8, is superimposed unchanged on the control signal. As soon as the method detects in subsequent runs that the currently determined state variable has left the target state class, this is recognized in step d) of the test, and steps e) and f) are carried out again until the state variable corresponds to the target state class again.

Advantageously, the current state variable determined in step a) is dependent on a change in the tooth stiffness of the toothed transmission stage caused by wear and/or ageing. Torque fluctuations on the output side of the electromotive drive, for example, cause inductive feedback on the motor current of the electromotive drive. Therefore, for example, the motor current contains information about the torque changes and therefore also about the changes in the transmission caused by wear and/or ageing. Therefore, depending on an operating state signal such as the motor current signal, for example, a state variable can also be formed which reflects the changes caused by wear and/or ageing.

The target state class in the classification space can be advantageously specified on the basis of reference state variables. The reference state variables can be determined on the basis of machine-learning systems in a manner analogous to step a) from the same operating state signals of reference drive trains, wherein the reference drive trains are assigned to different damage classes and each reference drive train of each damage class has a largely similar structure except for an individually specified damage or wear state.

The classification space with the state classes as the basis for evaluating the system state can, for example, be trained using a classification algorithm based on reference drive trains, wherein each individual reference drive train is assigned a known state class. An ensemble of drive trains can, for example, comprise at least ten or one hundred individual reference drive trains. The reference drive trains differ in that at least one transmission stage is known to have changed caused by wear or ageing, otherwise they are identical in design. The classification algorithm can be trained by operating the reference machines and receiving the same operating state signal or the same group of operating state signals for each reference drive train, for example a reference AC signal associated with a stator coil of the electromotive drive of the drive train. The state variables evaluated in this way can be summarized in state classes. The state classes can represent damage classes. The classification space data obtained in this way can, for example, be stored in a memory in a control unit of a drive train.

It is particularly advantageous if the method is carried out using a classification algorithm, wherein in step a) of the determination, values of a plurality of features are derived from the at least one operating state signal of the drive train, and so-called principal component variables are formed from the values of the plurality of features by coordinate transformation, wherein the number of features form the dimensions of a principal component space, wherein the principal component space forms the classification space and wherein each position in the principal component space represents a state variable which is associated with the values of the plurality of features or the features derived therefrom. The course of the change in the current state variable caused by wear or ageing describes a space curve in the principal component space. This makes it possible to control the periodic torque change signal, which returns the currently determined state variable to the spatial range of a target state class.

In a simple way, neighboring positions in a limited spatial range of the principal component space can be specified as a single target state class. Positions outside this spatial range are then recognized as an anomaly, which causes the state variable to be returned to the target state class. Positions outside the spatial range of the target state class can, for example, be defined as a second state class "abnormal".

However, it is not absolutely necessary to carry out a principal component analysis and classify the states in a principal component space. In principle, it is also possible to describe the classification space directly with the specific states. However, the principal component analysis improves the performance of the classification algorithms and is therefore particularly advantageous.

However, the items outside the spatial range assigned to the target state class can also be subdivided into at least two further state classes, in particular state classes defining damage classes.

The at least one operating state signal or several operating state signals can advantageously be selected from the following group of operating state signals:

a rotor position signal of the electromotive drive, a motor current signal of the electromotive drive, a structure-borne sound sensor signal which detects the structure-borne sound of at least one component of the drive train an airborne sound signal caused by a vibration excitation of the electromotive drive, a hydraulic pressure of a hydraulic component of the electromotive drive.

The at least one operating state signal can be detected in particular with a corresponding sensor element. For example, a motor current signal fed back into the motor current in the electromotive drive due to torque fluctuations on the output side can be detected as an operating state signal with a motor current sensor.

Advantageously, the size of an application parameter can be formed in the generation step as a function of a difference between the state class determined in step c) and a predefined target state class. This application parameter is used to change the periodic torque change signal.

The method according to the invention can be implemented on a computer, wherein a computer in the broadest sense can also be a data processing system or a microprocessor. Accordingly, the invention also comprises a computer program comprising instructions which, when executed by a computer, cause the computer to carry out the method according to the invention, and a computer-readable data carrier on which this computer program is stored.

Finally, the invention also comprises a computer comprising such a computer-readable data carrier and an evaluation and control unit comprising such a computer-readable data carrier and further comprising means for carrying out the method steps according to the invention.

BRIEF DESCRIPTION OF THE DRAWINGS

In the following, possible embodiment examples of the invention are explained with reference to the accompanying drawing. The following is shown in the drawings.

DETAILED DESCRIPTION

Figure 1:
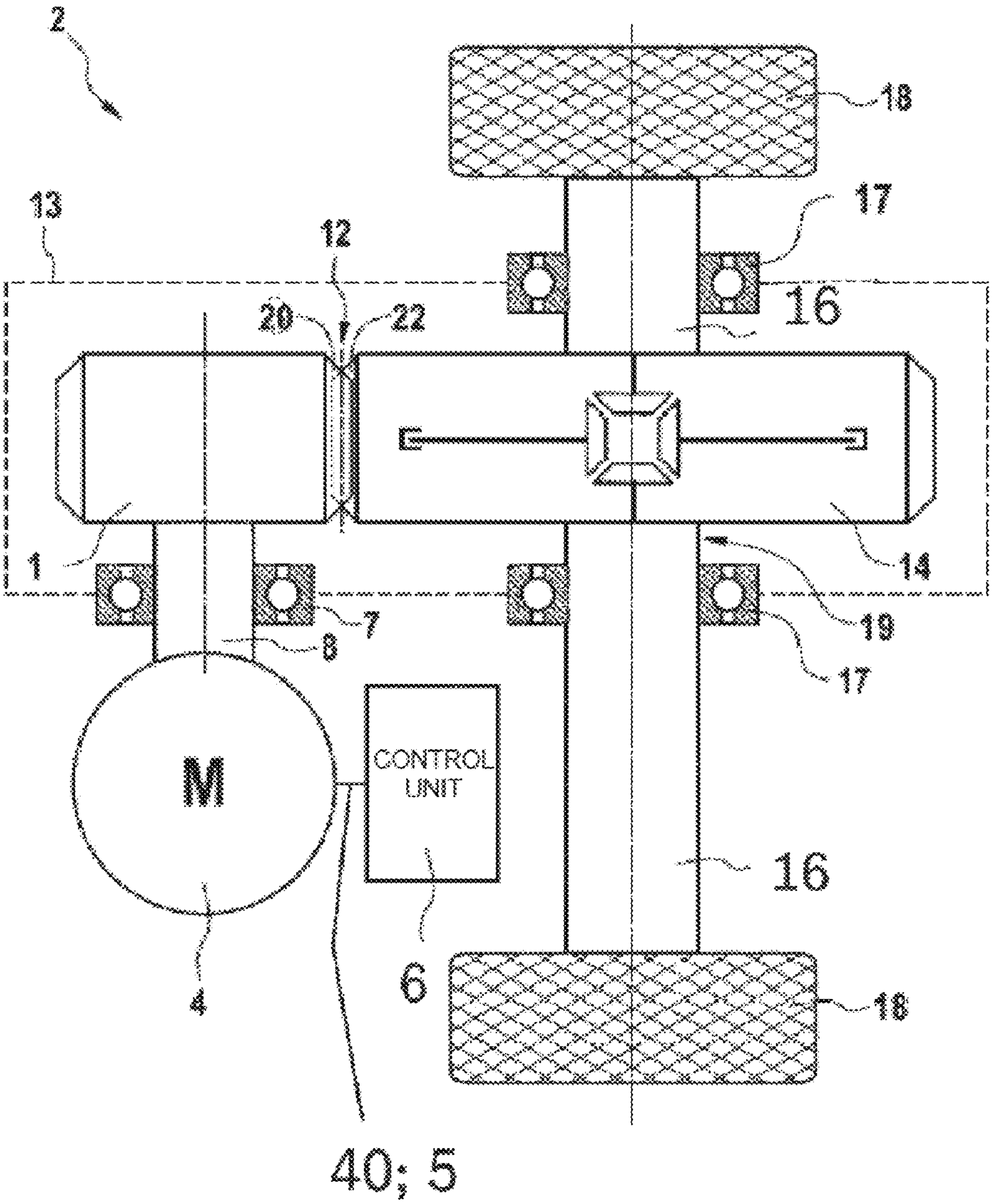
FIG. 1 a drive train used in a vehicle, which has a drive and an associated control unit with noise damping, FIG. 2 a permanently excited synchronous motor as an example of an electromotive drive used in the drive train, FIG. 3 a classification space using the example of a principal component analysis, FIG. 4 an example of a change in the current state variable in a two-dimensional principal component space caused by ageing and/or wear, FIG. 5 method steps of the method according to the invention.

FIG. 1 schematically shows a drive train 2 of an electric motor vehicle. The electric motor vehicle preferably does not have an internal combustion engine drive and can therefore only have an electromotive drive 4. The electromotive drive 4 is designed, for example, as a synchronous motor, in particular as a permanently excited synchronous motor, as an inverter-controlled asynchronous motor, DC motor, reluctance machine or transverse flux motor or other electric motor. The drive torque and the speed of the drive 4 can be varied by means of a control unit 6, which is provided for controlling the drive 4.

An output shaft 8 of the electromotive drive 4, which is rotatably mounted by means of a roller bearing 7, is non-rotatably connected to a first gearwheel 1 of a toothed transmission stage 12, which is arranged inside a transmission housing 13. The first gearwheel 1 meshes with a second gearwheel 14 of the transmission stage 12. The second gearwheel 14 can be coupled via a differential transmission to two drive shafts 16, which are mounted in roller bearings 17 and connected to vehicle wheels 18 so that they cannot rotate.

The first gearwheel 1 is smaller in diameter than the second gearwheel 14 and thus forms a pinion. A speed and a drive torque of the drive 4 are converted via the toothed transmission stage 12 for an output 19, which has the drive shafts 16. By means of the transmission stage 12, the speed of the drive 4 is converted to a lower transmission output speed and the drive torque is converted to a higher transmission output torque. The second gearwheel 14 can include a differential transmission which distributes the transmission output torque evenly between the two vehicle wheels 18. Alternatively, the transmission stage 12 can also be designed as a planetary transmission and/or as a shiftable transmission with several stages, in particular two stages, which have different ratios from one another.

The gearwheels 1, 14 can be straight-toothed or helical-toothed. The teeth 20, 22 of the gearwheels 1, 14 mesh with each other. The system consisting of the two meshing gearwheels 1, 14 with a variable tooth stiffness represents a dual-mass oscillator with a variable spring constant. The first gearwheel 1 has a first mass inertia and the second gearwheel 14 has a second mass inertia. The two gearwheels 1, 14 therefore form the dual-mass oscillator, which oscillates at a variable frequency dependent on the rotational path, a so-called tooth meshing frequency. Due to the variable tooth stiffness of the teeth, vibrations are excited on the meshing gearwheels 1, 14 during rotation, which are transmitted via the gearwheels 1, 14, the shafts 8, 16 and the roller bearings 7, 17 to the transmission housing 13, where they are emitted as noise by a vibrating surface. In addition to the rotational vibrations, the gearwheels 1, 14 also vibrate translationally with the bearings 7, 17 against the transmission housing 13, which causes the noise. This causes the transmission housing 13 to vibrate, so that sound waves propagate in the air in the form of pressure and density fluctuations.

The control unit 6 can have a control which is based on the imprint, i.e., superimposing a periodic additive torque oscillation via the electric drive 4 for damping unwanted noise with the gear mesh frequency during operation of the electric motor vehicle. For this purpose, a periodic torque change signal 5 is superimposed on a control signal 40 of the drive 4. The periodic torque change signal 5 alternately reduces and increases the drive torque. The periodic torque change signal 5 is in phase with the tooth stiffness of the transmission stage 12 connected to the power flow. The control signal 40 can in particular be a torque control signal or an output voltage signal of a torque control system. In particular, this torque control can be field-oriented, i.e., vector control. Field-oriented control ensures that the speed and positioning accuracy is improved with a frequency converter provided in the control unit 6.

This periodic torque change signal 5 ideally has no DC component or a DC component of zero. The torque change signal 5 increases or reduces a transmitted total torque that is set at the drive 4 on the basis of the torque control signal and the drive control signal. The tooth stiffness of the teeth 20, 22 currently in mesh determines whether the total torque is increased or reduced. On average, therefore, the output torque requested by the driver, which is set by the torque control operating in parallel, is not changed. The periodic torque change signal 5 can simulate the exact course of the torque fluctuation or, for example, be approximated by a sinusoidal signal of the same phase and frequency.

Since the influence of the change in tooth stiffness changes with a transmission output torque requested by the driver, the amplitude, i.e., a signal strength, of the torque control signal must be adjusted accordingly with the requested transmission output torque.

By adding a periodic stationary torque setpoint or voltage setpoint signal to an output signal of the, for example, field-oriented torque or current controller, a transmission noise can be damped with the gear mesh frequency.

Such a method is described in detail in the German patent application DE 10 2020 206 669.8 filed on May 28, 2020. In this respect, explicit reference is made at this point to the disclosure content of DE 10 2020 206 669.8.

Figure 2:
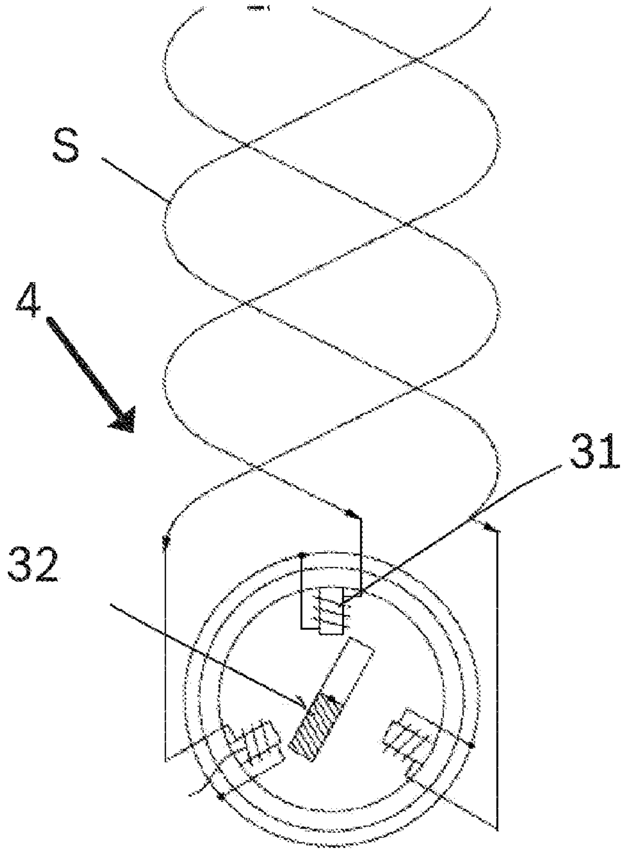

FIG. 2 shows a permanently excited synchronous motor as an exemplary embodiment of the electromotive drive 4. Three stator coils 31 are supplied with sinusoidal voltages or currents I, each phase-shifted by 120°. Torque fluctuations on the rotor 32 coupled to the output shaft 8 due to torque changes at the transmission stage 12 lead to changes in the motor currents due to the inductive feedback on the stator coils 31. These changes can be described by suitable signal characteristics and can serve as a basis for detecting wear-related changes in the tooth stiffness of transmission stage 12. The inductive feedback of torque fluctuations on the output side of the electromotive drive 4 to the motor current therefore means that the motor current contains information about the torque changes and therefore also about changes in the transmission. The motor current signal and/or a signal derived from it can be detected by one or more sensors and thus used, for example, as the at least one operating state signal S. However, a rotor position signal of the rotor 32 or, alternatively or additionally, a structure-borne sound sensor signal of a component of the drive train 2 received by means of a microphone can also be used as an operating state signal.

Values of several features, for example features $T_1$-$T_{11}$; $F_1$-$F_{13}$, in particular features as the basis of a principal component analysis, can be derived from the at least one operating state signal S or the several operating state signals of the drive train. If, for example, the motor current signal is used as the operating state signal S, it can be broken down into components x(n); s(k) and $f_k$, wherein x(n) is the time-sampled alternating current signal, s(k) is the associated discrete frequency spectrum and $f_k$ is the frequency associated with s(k).

From the components x(n); s(k) and $f_k$, for example, features $T_1$ through $T_{11}$ and $F_1$ through $F_{13}$ can be formed in the time domain or frequency domain, for example the following features proposed in ("A new approach to intelligent fault diagnosis of rotating machinery", Yaguo Lei et. al., Expert Systems with Applications 35, (2008) 1593-1600):

$$T_1 = \frac{\sum_{n=1}^{N} x(n)}{N};$$

$$T_2 = \sqrt{\frac{\sum_{n=1}^{N} (x(n) - T_1)^2}{N-1}};$$

-continued $$T_3 = \left(\frac{\sum_{n=1}^{N} \sqrt{|x(n)|}}{N}\right)^2;$$

$$T_4 = \sqrt{\frac{\sum_{n=1}^{N} (x(n))^2}{N}};$$

$$T_5 = \max|x(n)|;$$

$$T_6 = \sqrt{\frac{\sum_{n=1}^{N} (x(n) - T_1)^3}{(N-1)T_2^3}}$$

$$T_7 = \sqrt{\frac{\sum_{n=1}^{N} (x(n) - T_1)^4}{(N-1)T_2^4}};$$

$$T_8 = \frac{T_5}{T_4};$$

$$T_9 = \frac{T_5}{T_3};$$

$$T_{10} = \frac{T_4}{\frac{1}{N}\sum_{n=1}^{N} |x(n)|}$$

$$T_{11} = \frac{T_5}{\frac{1}{N}\sum_{n=1}^{N} |x(n)|};$$

$$F_1 = \frac{\sum_{k=1}^{K} s(k)}{K};$$

$$F_2 = \frac{\sum_{k=1}^{K} (s(k) - F_1)^2}{K-1};$$

$$F_3 = \frac{\sum_{k=1}^{K} (s(k) - F_1)^3}{K(\sqrt{F_2})^3}$$

$$F_4 = \frac{\sum_{k=1}^{K} (s(k) - F_1)^4}{KF_2^2};$$

$$F_5 = \frac{\sum_{k=1}^{K} f_k s(k)}{\sum_{k=1}^{K} s(k)};$$

$$F_6 = \sqrt{\frac{\sum_{k=1}^{K} (f_k - F_5)^2 s(k)}{K}}$$

$$F_7 = \sqrt{\frac{\sum_{k=1}^{K} f_k^2 s(k)}{\sum_{k=1}^{K} s(k)}};$$

$$F_8 = \sqrt{\frac{\sum_{k=1}^{K} f_k^4 s(k)}{\sum_{k=1}^{K} f_k^2 s(k)}};$$

$$F_9 = \frac{\sum_{k=1}^{K} f_k^2 s(k)}{\sum_{k=1}^{K} s(k) \sum_{k=1}^{K} f_k^4 s(k)}$$

$$F_{10} = \frac{F_6}{F_5};$$

$$F_{11} = \frac{\sum_{k=1}^{K} (f_k - F_5)^3 s(k)}{KF_6^3};$$

-continued $$F_{12} = \frac{\sum_{k=1}^{K} (f_k - F_5)^4 s(k)}{KF_6^4};$$

$$F_{13} = \frac{\sum_{k=1}^{K} (f_k - F_5)^{1/2} s(k)}{K\sqrt{F_6}}.$$

Characteristics derived from the features $T_1$-$T_{11}$; $F_1$-$F_{13}$ can be formed by a coordinate transformation, in particular a principal axis transformation or a principal component analysis (PCA). The derived characteristics can, for example, be principal component sizes or "principal components" for short. The number of characteristics corresponds to the number of principal component sizes. The number of characteristics $T_1$-$T_{11}$; $F_1$-$F_{13}$ forms the dimensions of a principal component space. The principal component space may be viewed as a classification space 100, wherein each position in the principal component space represents a state variable Z associated with the values of the plurality of features $T_1$-$T_{11}$; $F_1$-$F_{13}$ or the features derived therefrom. The assignment of the state variables Z can therefore be carried out on the basis of derived characteristics, which are derived from the characteristics by means of a transformation, in particular a linear transformation, preferably a principal axis transformation or a principal component analysis.

Figure 3:
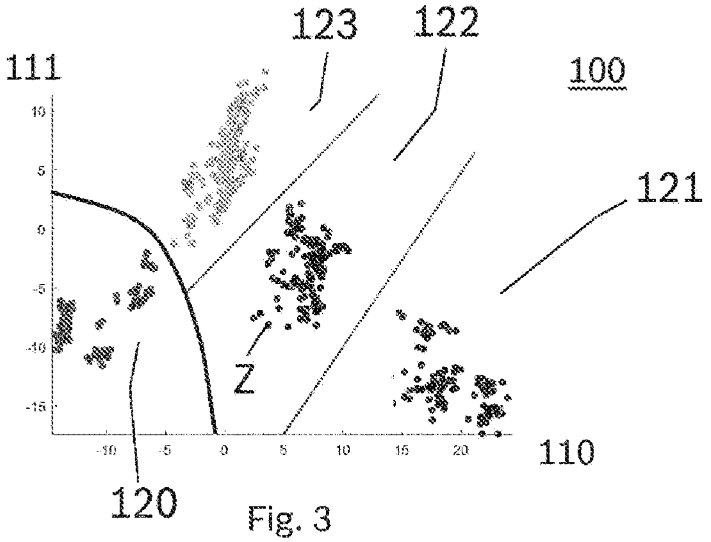

The assignment of the state variable Z is explained using the example in FIG. 3. FIG. 3 shows a two-dimensional principal component space as an example of a classification space 100. In this example, therefore, only two characteristics are considered. Two principal component sizes are derived from the two characteristics. The value of a first principal component size 110 is plotted on the abscissa and the value of a second principal component size 111 is plotted on the ordinate. The First Principal Component and the Second Principal Component can, for example, be derived from two of the characteristics $T_1$-$T_{11}$; $F_1$-$F_{13}$ using the transformation described above. Each position in the principal component space represents a state variable Z, which is assigned to the values of the several characteristics $T_1$-$T_{11}$; $F_1$-$F_{13}$ or the principal component variables derived from them.

Insights into the state variables Z of drive trains can be gained from evaluations of reference drive trains. The reference drive trains can have the same structure as in FIG. 1, but differ with regard to the displacement or ageing of individual components. By evaluating the respective similar operating state signal, state variables Z can be determined, as entered in the classification space 100 in FIG. 3. Since the state of the reference drive trains is known, state classes 120, 121, 122, 123 can be derived from this. For example, the positions of the state variables Z that are close to each other in the spatial range 120 of the principal component space 100 correspond to such reference drive trains that were considered to be "new" and wear-free. The state variables Z located beyond the spatial range 120 were determined using reference drive trains, which exhibit certain ageing or wear characteristics and are therefore assigned to different damage classes. Several reference drive trains assigned to a damage class can be evaluated in order to be able to access a sufficiently large number of state variables Z. In this way, further state classes can be defined as spatial ranges in FIG. 3, such as the state class 123 "used"; the state class 122 "subject to severe noise" or the state class 121 "defective or at risk of failure".

The knowledge gained in this way about the positions of the state classes in the spatial ranges of the classification space 100 can be stored in the control unit 6 of a drive train 2. A classification space 100 is preferably stored, in which at least the target state class 120 is defined as a delimited spatial range.

Figure 4:
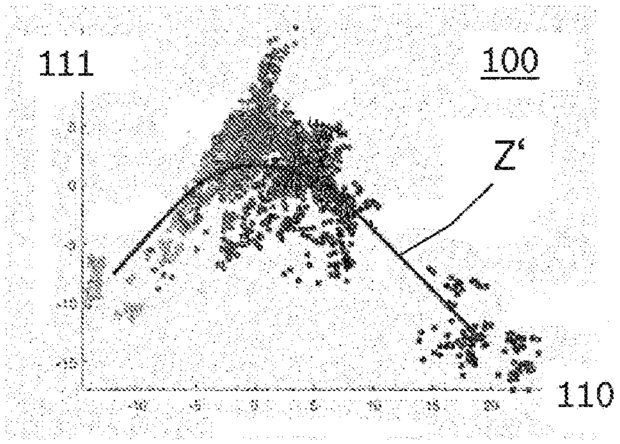

As the drive train 2 ages, the current state variable Z', which is determined over a longer period of time according to the same criteria, follows a course during ageing as shown by the curve in FIG. 4. The position of the current state variable Z' in the classification space 100 gradually moves over time from the target state class 120 to the state class 123 and from there to the state class 122 and finally to the state class 121.

Figure 5:
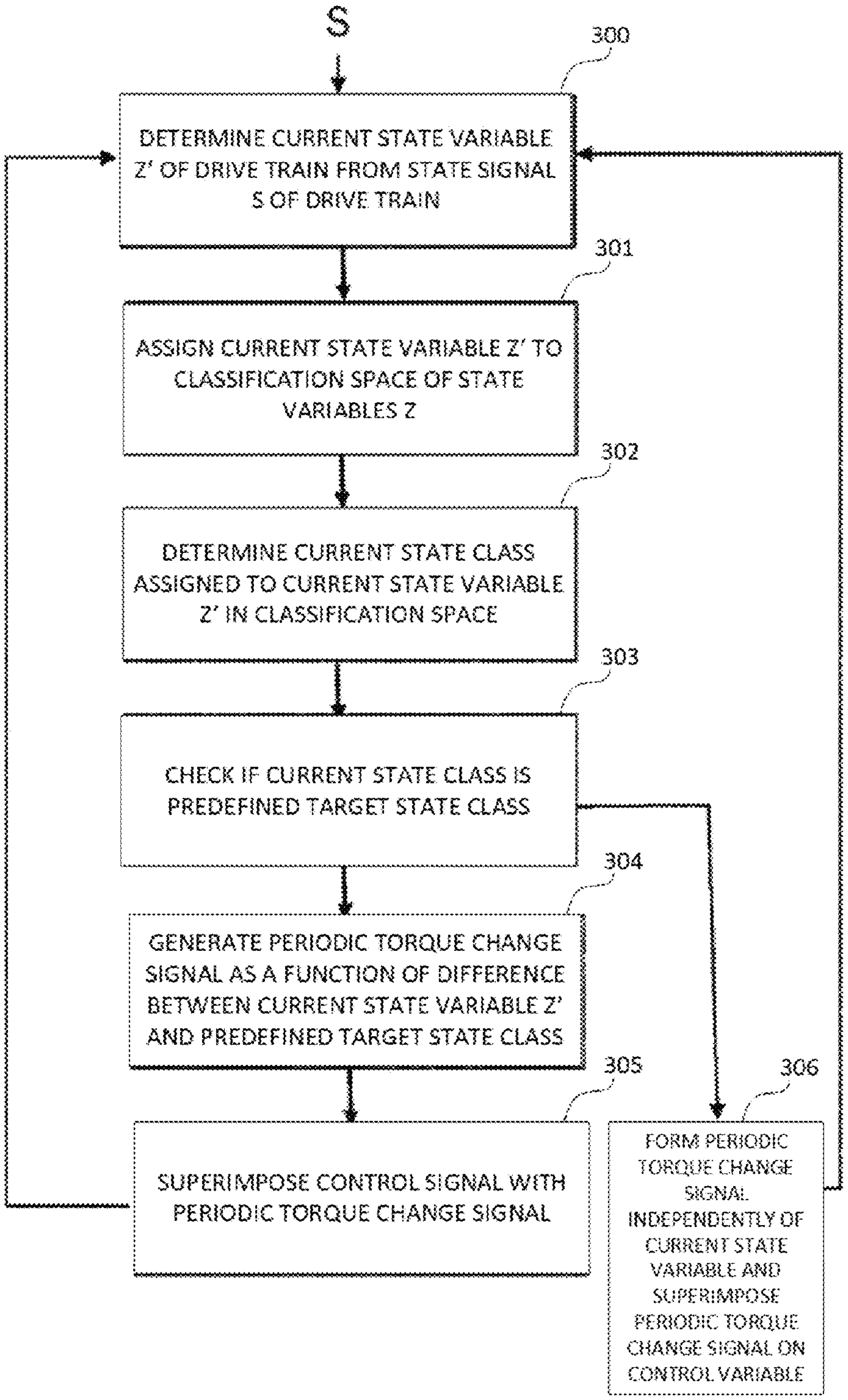

With the method described below with reference to FIG. 5, a change in the state of the drive train, which is attributable to a long-term change in the tooth stiffness of the transmission stage over time, is detected over the service life and, based on this change, the torque control is adjusted so that noise developments caused by ageing or wear are better damped.

In a first step 300, a current state variable Z' of the drive train 4, which is dependent on the tooth stiffness of the toothed transmission stage 12, is determined from the operating state signal S. Then, in a subsequent step 301, this current state variable Z' is assigned to the classification space 100 of state variables. In a further step 302 following step 301, the current state class assigned to the current state variable Z' in the classification space 100 can be determined. In the subsequent step 303, the system checks whether the current state class determined in step 302 is the target state class 120. If it is established that the current state class determined in step 302 is not the target state class 120, the periodic torque change signal 5 is generated in a subsequent step 304 as a function of a difference between the current state class determined in step 300 and the predetermined target state class 120.

This can be done in a simple way, for example, by forming an application parameter A if a difference is detected between the current state variable Z' determined in step a) and the target state class. For example, the application parameter A is preferably formed as a function of the size of the distance of the current state variable Z' from the target state class 120 in the classification space 100. Depending on the application parameter formed in this way, the periodic torque change signal 5 formed as described above is changed in the control unit 6, wherein the application parameter modifies, for example, the amplitude of the torque change signal 5. The modified periodic torque change signal 5 is superimposed on the control signal 40 in the subsequent step 305. The method then returns to step 300 and determines a new current state variable Z' of the drive train. If it is established in step 303 for the newly determined current state variable Z' that the current state variable Z' is still not in the target state class 120, steps 304 and 305 are carried out again and the application parameter is changed again until the currently determined state variable Z' corresponds to the target state class 120. The application parameter can therefore be changed step by step. The method runs through a control loop.

However, if it is established in step 303 that a current state variable Z' assigned to the target state class 120 was determined in the previous step of determining 300, steps 304 and 305 are not carried out and instead the periodic torque change signal 5 is formed in a step 306 independently of the current state variable and superimposed on the control variable. Finally, after performing step 306, steps a) through d) are repeated until step d) of testing 303 establishes at a point in time that the determined current state class no longer corresponds to the predetermined target state class 120. Then, as explained above, the method is continued with steps 304 and 305.

It goes without saying that the target state class 120 can be freely specified. Depending on the desired quality of noise reduction, a wider or narrower spatial range of the classification space 100 can therefore be assumed as target state class 120.

The invention claimed is:

1. A method for operating a drive train (2) having an electromotive drive (4), wherein a speed and a drive torque of the electromotive drive (4) can be converted via a toothed transmission stage (12) for an output (19), and a torque output of the electromotive drive (4) is controlled with a control signal (40), wherein a periodic torque change signal (5) which alternately reduces and amplifies the drive torque is superimposed on the control signal (40) in order to damp transmission noises, wherein the periodic torque change signal (5) is in phase with a periodic change in the tooth stiffness of the toothed transmission stage (12), the method comprising:

a) determining (300) a current state variable (Z') of the drive train, which is dependent on the tooth stiffness of the toothed transmission stage (12), from at least one operating state signal(S) of the drive train, b) assigning (301) the current state variable (Z') to a classification space of state variables (Z), wherein state classes (120, 121, 122, 123) are assigned to all state variables (Z) of the classification space, c) determining (302) a current state class assigned to the current state variable (Z') in the classification space (100), and d) checking (303) whether the current state class determined in the determination step (302) is a predefined target state class (120), wherein, if the current state class is not the target state class (120), the method further comprises:

e) generating (304) the periodic torque change signal (5) as a function of a difference between the current state variable (Z') determined in the step of determining (300) and the predetermined target state class (120), f) superimposing (305) the control signal (40) with a periodic torque change signal (5) generated as a function of the difference, g) repeating the preceding steps a) through f) at least until it is established in the step of checking (303) that a current state variable (Z') assigned to the target state class (120) was determined in the preceding step of determining (300), and h) controlling the torque output of the electromotive drive (4) via the control signal (40).

2. The method according to claim 1, wherein if it is established in the step of checking (303) that a current state variable (Z') assigned to the target state class (120) was determined in the preceding step of determining (300), the method does not perform the step of generating (304) and the step of superimposing (305) and instead, in a step (306), forms the periodic torque change signal (5) independently of the current state variable and superimposes it on the control signal, and repeating steps a) through d) until it is established in the step of checking (303) that the determined current state class is not the predetermined target state class (120).

3. The method according to claim 1, wherein the current state variable (Z') determined in step a) of the determination (300) is dependent on a change in the tooth stiffness of the toothed transmission stage (12) caused by wear and/or ageing.

4. The method according to claim 1, wherein the target state class (120) in the classification space (100) is predetermined on the basis of reference state variables, wherein the reference state variables are determined beforehand in a manner analogous to step a) of determining (300) from the same operating state signals of reference drive trains, wherein the reference drive trains are assigned to different damage classes and each reference drive train of each damage class has the same type of structure except for an individually predetermined damage or wear state.

5. The method according to claim 1, wherein a classification algorithm is used, wherein in step a) of determining (300), values of a plurality of features ($T_1$-$T_{11}$; $F_1$-$F_{13}$) are derived from the at least one operating state signal(S) of the drive train, and principal component quantities (310, 311) are formed from the values of the plurality of features by coordinate transformation, wherein the number of features ($T_1$-$T_{11}$; $F_1$-$F_{13}$) form the dimensions of a principal component space, wherein the principal component space forms the classification space (100) and wherein each position in the principal component space represents a state variable (Z) which is associated with the values of the plurality of features ($T_1$-$T_{11}$; $F_1$-$F_{13}$) or the features derived therefrom.

6. The method according to claim 5, wherein adjacent positions in a limited spatial range of the principal component space are predetermined as a single target state class (120) and positions outside this spatial range are predetermined as an anomaly.

7. The method according to claim 6, wherein positions outside the spatial range assigned to the target state class (120) are subdivided into at least two further state classes (121, 122, 123) defining damage classes.

8. The method according to claim 1, wherein the at least one operating state signal(S) or several operating state signals are selected from the following group of operating state signals:

a rotor position signal from the electromotive drive, a motor current signal from the electromotive drive, a structure-borne sound sensor signal which detects the structure-borne sound of at least one component of the drive train (2), an airborne sound signal caused by a vibration excitation of the electromotive drive, a hydraulic pressure of a hydraulic component of the electromotive drive.

9. The method according to claim 1, wherein in step e) of generating (304), the magnitude of an application parameter (A) is formed as a function of a difference between the current state variable (Z') determined in step a) and a predetermined target state class (120), and the periodic torque change signal (5) is changed as a function of the magnitude of the application parameter (A).

10. An evaluation and control unit configured to carry out the method according to claim 1.

11. A non-transitory, computer readable medium including instructions that when executed by a computer cause the computer to operate a drive train (2) having an electromotive drive (4), wherein a speed and a drive torque of the electromotive drive (4) can be converted via a toothed transmission stage (12) for an output (19), and a torque output of the electromotive drive (4) is controlled with a control signal (40), wherein a periodic torque change signal (5) which alternately reduces and amplifies the drive torque is superimposed on the control signal (40) in order to damp transmission noises, wherein the periodic torque change signal (5) is in phase with a periodic change in the tooth stiffness of the toothed transmission stage (12), by:

a) determining (300) a current state variable (Z') of the drive train, which is dependent on the tooth stiffness of the toothed transmission stage (12), from at least one operating state signal(S) of the drive train, b) assigning (301) the current state variable (Z') to a classification space of state variables (Z), wherein state classes (120, 121, 122, 123) are assigned to all state variables (Z) of the classification space, c) determining (302) a current state class assigned to the current state variable (Z') in the classification space (100), and d) checking (303) whether the current state class determined in the determination step (302) is a predefined target state class (120), wherein, if the current state class is not the target state class (120), the method further comprises:

e) generating (304) the periodic torque change signal (5) as a function of a difference between the current state variable (Z') determined in the step of determining (300) and the predetermined target state class (120), f) superimposing (305) the control signal (40) with a periodic torque change signal (5) generated as a function of the difference, g) repeating the preceding steps a) through f) at least until it is established in the step of checking (303) that a current state variable (Z') assigned to the target state class (120) was determined in the preceding step of determining (300), and h) controlling the torque output of the electromotive drive (4) via the control signal (40).

* * * * *